United States Patent
Noma (12) United States Patent (10) Patent No.: US 7,199,561 B2
Noma (45) Date of Patent: Apr. 3, 2007

(54) DC-DC CONVERTER AND CONVERTER DEVICE

(75) Inventor: Takashi Noma, Moriyama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/554,523

(22) PCT Filed: Apr. 27, 2005

(86) PCT No.: PCT/JP2005/007972

§ 371 (c)(1),
(2), (4) Date: Oct. 25, 2005

(87) PCT Pub. No.: WO2006/003751

PCT Pub. Date: Jan. 12, 2006

(65) Prior Publication Data

US 2007/0013353 A1 Jan. 18, 2007

(30) Foreign Application Priority Data

Jul. 1, 2004 (JP) .............................. 2004-195363

(51) Int. Cl.
*G05F 1/613* (2006.01)
(52) U.S. Cl. ...................... 323/224; 323/280; 323/281; 323/269
(58) Field of Classification Search ................ 323/224, 323/280, 281, 269
See application file for complete search history.

(56) References Cited

U.S. PATENT DOCUMENTS 7,098,639 B2 * 8/2006 Natsume et al. ............ 323/282

FOREIGN PATENT DOCUMENTS

| JP | 53-111457 | 9/1978 |
| JP | 60-190165 | 9/1985 |
| JP | 09-051672 | 2/1997 |
| JP | 10-164841 | 6/1998 |
| JP | 2003-009518 | 1/2003 |
| JP | 2003-235247 | 8/2003 |

* cited by examiner

*Primary Examiner*—Shawn Riley
(74) *Attorney, Agent, or Firm*—Keating & Bennett, LLP (57) ABSTRACT

In a converter device, an N-type FET is connected in series between an input terminal and an output terminal and an N-type FET is connected between the side of the output terminal of the N-type $FET_1$ and a ground terminal. A smoothing circuit and a comparator circuit are connected to the side of the output terminal of the circuits. The output side of the comparator circuit is connected to an H/S driver circuit controlling the N-type $FET_1$ through an inverter and directly connected to an L/S driver circuit controlling the N-type $FET_2$. A reference voltage correction circuit is included in the comparator circuit, and the comparator circuit outputs an appropriate switching control signal by comparing a correction reference voltage, obtained through comparison of a divider voltage in accordance with the time average value of an output voltage with a reference voltage, with the divider voltage.

6 Claims, 8 Drawing Sheets

| (R1+R2)/R2 | SET VOLTAGE VALUE (V) | NO REFERENCE VOLTAGE CORRECTION | | REFERENCE VOLTAGE CORRECTED | |
|---|---|---|---|---|---|
| | | OUTPUT VOLTAGE AVERAGE VALUE(V) | ERROR(%) | OUTPUT VOLTAGE AVERAGE VALUE(V) | ERROR(%) |
| 1.000 | 0.800 | 0.817 | +2.1 | 0.799 | -0.1 |
| 1.875 | 1.500 | 1.517 | +1.1 | 1.502 | +0.1 |
| 2.250 | 1.800 | 1.816 | +0.9 | 1.802 | +0.1 |
| 2.500 | 2.000 | 2.012 | +0.6 | 2.002 | +0.1 |
| 3.125 | 2.500 | 2.510 | +0.4 | 2.504 | +0.2 |
| 4.125 | 3.300 | 3.297 | -0.1 | 3.306 | +0.2 |

| | OPERATION FREQUENCY(kHz) | OUTPUT VOLTAGE(V) | CURRENT SHARE IN PARALLEL CONNECTION |
|---|---|---|---|
| CONVERTER A | 520 | 2.562 | 70% |
| CONVERTER B | 555 | 2.504 | 30% |

| | OPERATION FREQUENCY(kHz) | OUTPUT VOLTAGE(V) | CURRENT SHARE IN PARALLEL CONNECTION |
|---|---|---|---|
| CONVERTER A | 510 | 2.562 | 51% |
| CONVERTER B | 510 | 2.562 | 49% |

DC-DC CONVERTER AND CONVERTER DEVICE

BACKGROUND OF THE INVENTION

1. Field of the Invention

The present invention relates to a DC—DC converter for down converting an input DC voltage to a fixed value DC voltage, that is, a ripple detection self-oscillating step-down converter and a converter device having a plurality of connected stand-alone converters.

2. Description of the Related Art

Presently, low voltage and large current DC—DC converters are required due to the demand for power supply circuits in computers, etc. PWM controlled converters and ripple detection type self-oscillators (hereinafter simply referred to as ripple converters) representing such DC—DC converters are used. Since the response to load change is excellent, ripple converters, used since before the later developed PWM controlled converters, are being paid attention to once again.

Figures 11, 12:
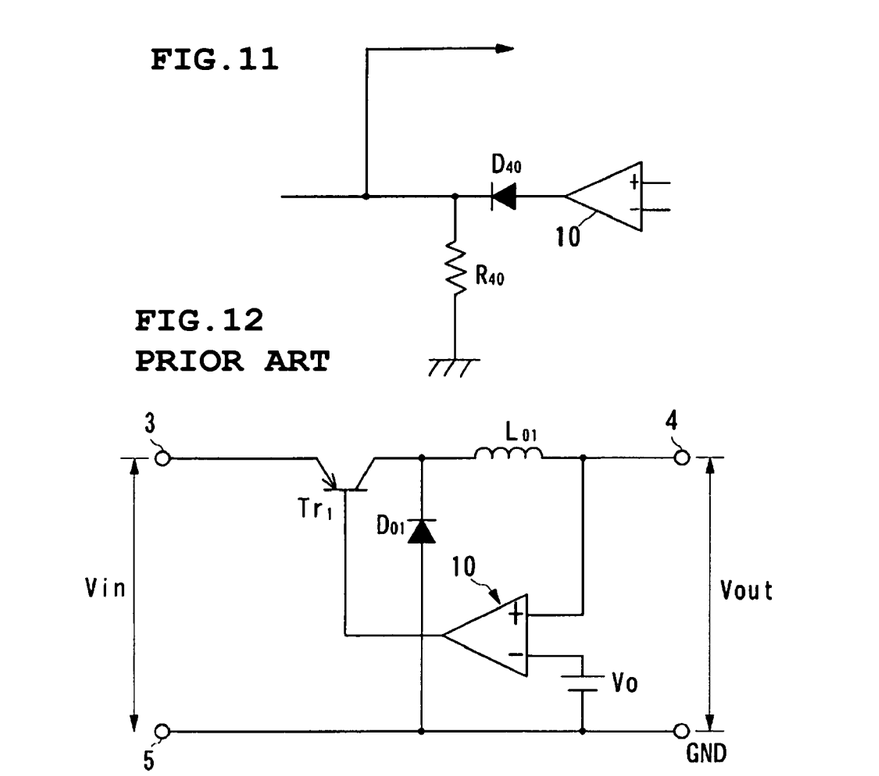
FIG. 11 is a circuit diagram of another construction showing the output portion of the comparator of the ripple converter of the converter device shown in FIG. 6.
FIG. 12 is a circuit diagram showing the basic circuit of a ripple converter.

FIG. 12 is a circuit diagram showing the basic circuit of a ripple converter.

As shown in FIG. 12, the ripple converter contains a PNP transistor $Tr_1$ as a switching element and an inductor $L_{01}$ connected in series between an input terminal 3, to which an input voltage Vin is input, and an output terminal 4 from which an output voltage Vout is output. The ripple converter also contains a flywheel diode $D_{01}$ connected between the ground (and the ground terminal 5) and the connection point of the PNP transistor $Tr_1$ and the inductor $L_{01}$. Furthermore, a voltage in accordance with the output voltage Vout is input to the non-inverting input terminal, a reference voltage Vo is input to the inverting input terminal, and a comparator 10 outputting a switching control signal to the PNP transistor $Tr_1$ is provided.

In such a ripple converter, when the PNP transistor $Tr_1$ is in the off state and the output voltage Vout becomes lower than the reference voltage Vo, a Low signal is output from the comparator and input to the base of the PNP transistor $Tr_1$, and then, the PNP transistor $Tr_1$ is turned on. Then, when the PNP transistor $Tr_1$ is turned on, the output voltage Vout increases. On the other hand, when the PNP transistor $Tr_1$ is in the on state and the output voltage Vout becomes higher than the reference voltage Vo, a High signal is output from the comparator and input to the base of the PNP transistor $Tr_1$, and then, the PNP transistor $Tr_1$ is turned off. Then, since the PNP transistor $Tr_1$ is turned off, the output voltage Vout decreases. By repeating such a control, the output voltage Vout goes up and down around a voltage close to the reference voltage Vo and an output voltage Vout substantially equal to the reference voltage Vo is obtained.

Figure 13:
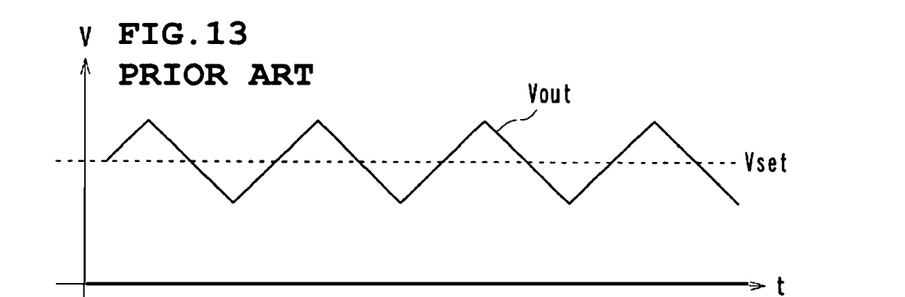
FIG. 13 shows the output voltage waveform of a related ripple converter.

FIG. 13 shows the output voltage waveform of a related ripple converter.

As shown in FIG. 13, the output voltage Vout becomes a triangular waveform having a ripple in which the voltage (amplitude) goes up and down from a set voltage Vset, as a reference, on the basis of the reference voltage Vo. Then, in normal operation, the average voltage of the output voltage Vout is substantially in the middle between the maximum voltage and the minimum voltage in the waveform.

As a practical circuit of such a ripple converter, Japanese Unexamined Patent Application Publication No. 9-51672 discloses a ripple converter in which a switching element of a P-type FET and a choke coil are connected between an input terminal and an output terminal and a diode is connected between the ground potential and the connection point of the p-type FET and the choke coil. Furthermore, the ripple converter contains a comparator in which a voltage in accordance with the output voltage is input to the inverting input terminal and a reference voltage is input to the non-inverting input terminal and a driver IC outputting a switching control signal to the p-type FET in accordance with the output voltage of the comparator. Then, in this ripple converter, a desired output voltage is obtained from a fixed input voltage in such a way that the output voltage is compared with the reference voltage and the P-type FET is switched on the basis of the comparative result.

Now, in the related ripple converter in which the output voltage Vout is controlled so as to be constant, when the switching control is continuously performed, the duty factor, which is the ratio of the on time to the total of the on time and off time of a switching element such as an FET, etc., is dependent on the input voltage Vin. Or in a ripple converter in which the input voltage Vin is constant and the output voltage Vout changes according to the set condition, the duty factor is dependent on the output voltage Vout.

In the related ripple converter, there has been a problem in that, when the duty factor changes, the output voltage varies. Hereinafter, the principle is described.

Figures 14A, 14B:
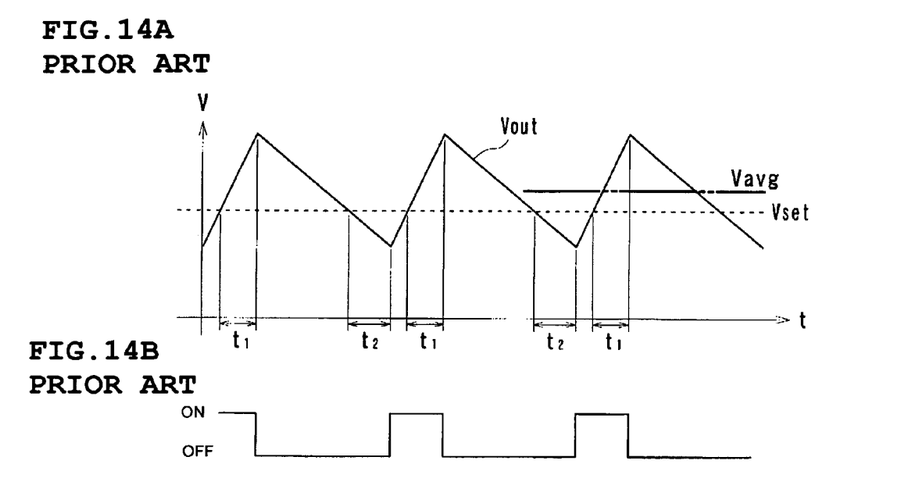
FIGS. 14(A) and 14(B) show the waveform of the instantaneous value and the average value Vavg of the output voltage Vout, the set voltage Vset (reference voltage Vo), and the on and off state of the switching element in the case where the input voltage Vin is high.
Figures 15A, 15B:
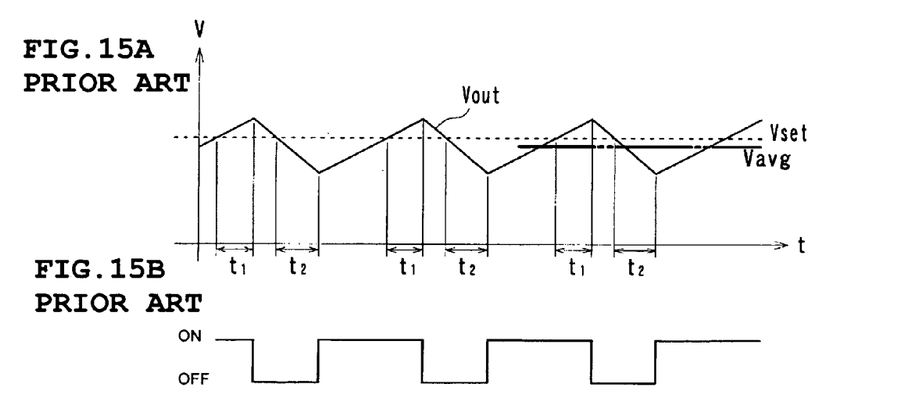
FIGS. 15(A) and 15(B) show the waveform of the instantaneous value and the average value Vavg of the output voltage Vout, the set voltage Vset (reference voltage Vo), and the on and off state of the switching element in the case where the input voltage Vin is low.

FIG. 14 shows the waveform of the instantaneous value of the output voltage Vout, the average value Vavg, the set voltage Vset (dependent on the reference voltage Vo), and the on and off state of the switching element in the case where the input voltage is high. Furthermore, FIG. 15 shows the waveform of the instantaneous value of the output voltage Vout, the average value Vavg, the set voltage Vset (dependent on the reference voltage Vo), and the on and off state of the switching element in the case where the input voltage is low.

In the above-described ripple converter, when the instantaneous value of the output voltage Vout exceeds the set voltage Vset, the switching element is turned off. The time from the point where the instantaneous value of the output voltage Vout exceeds the set voltage Vset to the point where the switching element is turned off, that is, the time (t1 in the drawing) from the point where the instantaneous value of the output voltage Vout exceeds the set voltage Vset to the point where the instantaneous value becomes the maximum is decided by the circuit construction of the ripple converter, and not decided by the input voltage Vin, and accordingly, the time is basically the same.

Therefore, as shown in FIG. 14, when the input voltage Vin is high, since the slope of the increase in the output voltage Vout becomes steep, the maximum value of the output voltage Vout becomes high in accordance with the input voltage Vin. Here, since the rate at which the output voltage decreases is constant regardless of the input voltage, the time during which the instantaneous value of the output voltage Vo decreases from the maximum to the set voltage Vset becomes longer as the input voltage Vin increases.

On the other hand, the time from the point where the instantaneous value of the output voltage Vout goes below the set voltage Vset to the point where the instantaneous value becomes the minimum, that is, the time (t2 in the drawing) from the point where the instantaneous value of the output voltage Vout goes below the set voltage Vset to the point where the switching element is turned on is the same (does not change) regardless of the input voltage Vin. Accordingly, the minimum value of the output voltage Vout is constant regardless of the input voltage Vin. Moreover, the time from the point where the instantaneous value of the output voltage Vout becomes the minimum to the point where the instantaneous value returns to the set voltage Vset becomes shorter as the input voltage Vin increases because of the increasing amount of change of the voltage. Accordingly, the time during which the switching element is in the on state becomes shorter than the total of the time during which the switching element is in the on state and the time during which the switching element is in the off state. That is, the duty factor of the switching element becomes smaller. In this way, when the duty factor of the switching element becomes smaller, although the off time of the switching element, that is, the time during which the switching element is in the off state becomes longer, since the time during which the instantaneous value of the output voltage Vout is lower than the set voltage Vset in the off time is constant regardless of the input voltage Vin. Accordingly, when the input voltage Vin increases, as shown in FIG. 14, the time during which the instantaneous value of the output voltage Vout is higher than the set voltage Vset becomes longer. Because of this, the output voltage average value Vavg which is the time-average of the instantaneous value of the output voltage Vout becomes higher than the set voltage Vset.

Furthermore, as shown in FIG. 15, when the input voltage Vin is low, after the switching element has been turned on, a voltage transmitted to the output terminal Vout is also reduced in accordance with the input voltage Vin. Here, since the rate at which the output voltage Vout is lowered is constant regardless of the input voltage Vin, the time during which the instantaneous value of the output voltage Vout decreases from the maximum value to the set voltage Vset is more reduced as the input voltage Vin decreases.

On the other hand, the time from the point where the instantaneous value of the output voltage Vout goes below the set voltage Vset to the point where the instantaneous value becomes the minimum value, that is, the time (t2 in the drawing) from the point where the instantaneous value of the output voltage Vout goes below the set voltage Vset to the point where the switching element is turned on is also the same regardless of the input voltage Vin. Moreover, the time from the point where the instantaneous value of the output voltage Vout becomes the minimum to the point where the instantaneous value returns to the set voltage Vset becomes longer because the amount of change of the voltage is more reduced as the input voltage Vin decreases. Accordingly, the time during which the switching element is in the on state becomes longer to the total of the time during which the switching element is in the on state and the time during which the switching element is in the off state. That is, the duty factor of the switching element becomes larger. In this way, when the duty factor of the switching element becomes large, the on time of the switching element becomes long. However, in the on time, since the time during which the instantaneous value of the output voltage Vout is higher than the set voltage Vset is constant regardless of the input voltage Vin, when the input voltage Vin decreases, as shown in FIG. 15, the time during which the instantaneous value of the output voltage Vout is lower than the set voltage Vset becomes longer. Therefore, the output voltage average value Vavg, which is the time average of the instantaneous value of the output voltage Vout, becomes lower than the set voltage Vset.

Thus, when the related ripple converter is used, the average value of the output voltage Vout varies dependent on the value of the switching duty factor.

Furthermore, when ripple converters of the above-described construction are operated in parallel, the output terminals of the ripple converters in parallel operation are connected in parallel. But, as described above, the output voltage of each ripple converter is not constant due to the input voltage value and other factors. Accordingly, there is a possibility that a ripple converter having a high output voltage may adversely affect the operation of other converters. However, since the ripple converters do not contain a current detection mechanism, it is difficult to make uniform the load current of each ripple converter in parallel operation. Therefore, it is difficult to perform stable parallel operation of the ripple converters.

SUMMARY OF THE INVENTION

In order to overcome the problems described above, preferred embodiments of the present invention provide a ripple converter type DC—DC converter in which a fixed output voltage can be stably obtained without being affected by the value of a switching duty factor or without being affected by the change of an output voltage set value.

Furthermore, preferred embodiments of the present invention provide a converter device in which the operation of each ripple converter is stabilized when a plurality of ripple converter type DC—DC converters are operated in parallel.

A DC—DC converter of a preferred embodiment of the present invention includes an N-type FET for on and off controlling an input voltage, a smoothing circuit for smoothing a voltage output from the N-type FET and outputting the smoothed voltage, and a comparator circuit for outputting a switching control signal for the on and off controlling by comparing a voltage output from the smoothing circuit with a set voltage. In the DC—DC converter, the comparator circuit outputs the switching control signal by detecting the time average value of the voltage output from the smoothing circuit, comparing the detected time average value with the set voltage, and comparing a correction set voltage obtained on the basis of the comparative result with the voltage output from the smoothing circuit.

The comparator circuit corrects the set voltage (reference voltage) by a voltage in accordance with the difference between the output voltage time average and the set voltage (reference voltage) output from a constant-voltage power supply. At this time, for example, when the output voltage is high, the set voltage is corrected to be low, and, when the output voltage is low, the set voltage is corrected to be high. Then, the comparator circuit outputs a switching control signal for on and off controlling the N-type FET by comparing the output voltage and the corrected set voltage.

Furthermore, in a DC—DC converter of a preferred embodiment of the present invention, the comparator circuit includes a reference power supply generating a reference voltage in accordance with the set voltage, a divider circuit generating a comparative voltage by dividing the reference voltage, and a correction voltage generation circuit generating a correction voltage from the comparative voltage and the time average value of the voltage output from the smoothing circuit, and the correction set voltage is generated by applying the output from the correction voltage generation circuit to the generation point of the comparative voltage through a resistor.

In this construction, a comparative voltage is provided in the divider circuit by using a reference voltage generated from one reference voltage power supply, and a correction voltage for correcting the comparative voltage in accordance with the reference voltage is provided by comparing the comparative voltage with a voltage time average value in accordance with the output voltage. Then, a correction set voltage of the comparative voltage corrected by the correction voltage is compared with a voltage in accordance with the output voltage and a switching control signal in accordance with the comparative result is output by the comparator circuit.

Furthermore, a converter device of a preferred embodiment includes a plurality of DC—DC converters. In the converter device, the output terminals of the plurality of DC—DC converters are connected in parallel, and a switching control signal common to all the DC—DC converters connected in parallel is generated by using the logical sum or logical product of the outputs of the comparator circuits of the plurality of DC—DC converters.

In this construction, when the logical sum or logical product of the outputs of the comparator circuits of the converters connected in parallel is used, even if the switching control signal output from the comparator of all the converters is not the same, the switching control signal is unified to a switching control signal output from one of the comparator circuits. Accordingly, the N-type FET of all the converters connected in parallel is controlled by the same switching control signal.

Furthermore, in a converter device of a preferred embodiment of the present invention, the output portion of the comparator circuit of each DC—DC converter is of an open collector type or open drain type and these output portions are connected to each other.

In this construction, the output of the comparator circuit is of an open collector type or open drain type and the construction of the DC—DC converter in parallel connection becomes easy by connecting the outputs of the comparator circuits in parallel.

According to a preferred embodiment of the present invention, the set voltage is corrected in accordance with the value of a switching duty factor in such a way that the output voltage time average is detected and the set voltage is corrected by a voltage in accordance with the difference between the output voltage time average and the set voltage. Thus, a DC—DC converter for obtaining a stable output voltage can be constructed without being affected by the value of a switching duty factor. Moreover, by making use of the effect, a DC—DC converter for obtaining a stable output voltage can be constructed even if the set value of the output voltage changes.

Furthermore, according to a preferred embodiment of the present invention, a reference voltage formed from one reference power supply is divided, the divided reference voltage is used for correction of the set voltage, the divider voltage of the reference voltage is corrected by the correction result, and the correction reference voltage is compared with a voltage in accordance with the output voltage. Accordingly, the correction of the set voltage is stabilized. Thus, a DC—DC converter for obtaining a stable output voltage can be constructed.

Furthermore, according to a preferred embodiment of the present invention, since all the converters connected in parallel are controlled by the same switching control signal, the output current of all the converters becomes constant. That is, a converter device having a stable load current can be constructed.

Furthermore, according to a preferred embodiment of the present invention, since the output of each comparator circuit is preferably an open collector type or an open drain type, the parallel connection having a common switching control signal is simplified. Thus, a converter device having a stable load current has a simple structure.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

A ripple converter type DC—DC converter according to a first preferred embodiment of the present invention is described with reference to FIGS. 1 to 5.

Figures 1, 2:
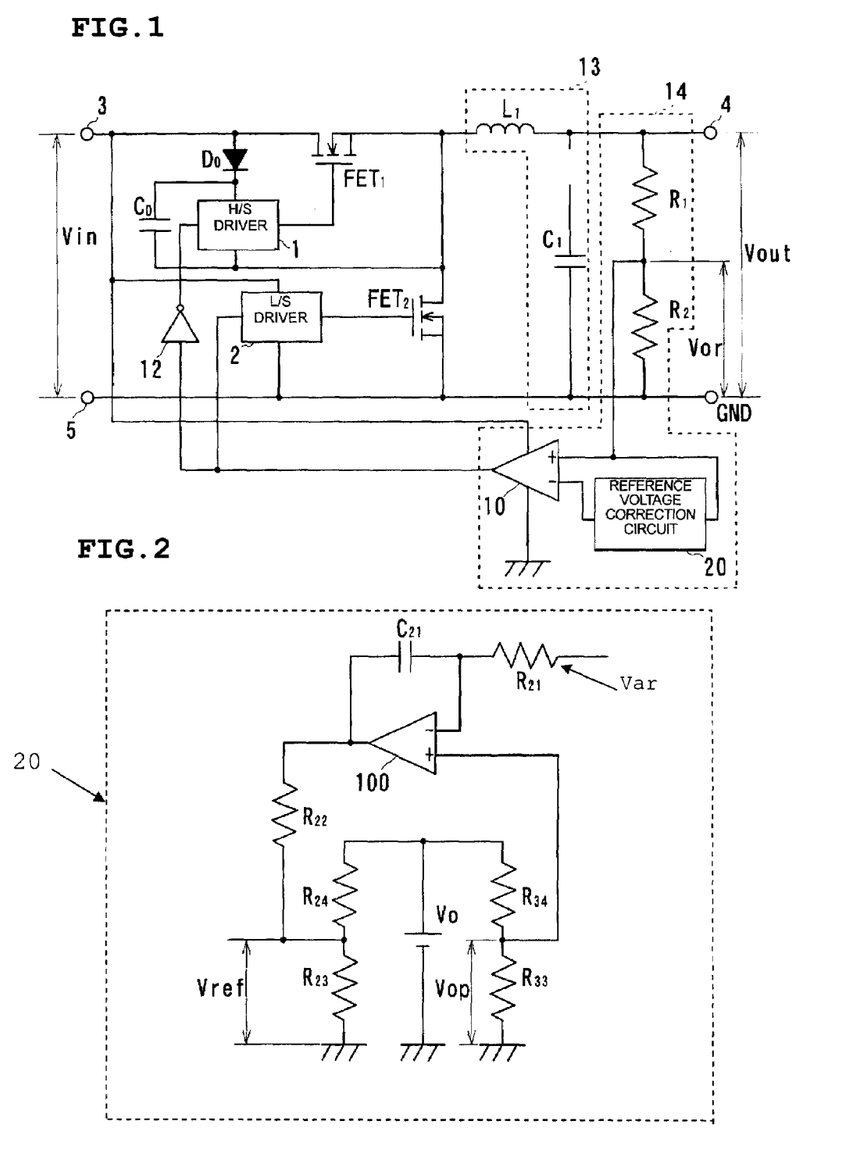
FIG. 1 is a circuit diagram showing the construction of a ripple converter of a first preferred embodiment of the present invention.
FIG. 2 is the detailed circuit diagram of a reference voltage correction circuit shown in FIG. 1.

FIG. 1 is a circuit diagram showing the construction of a ripple converter of the present preferred embodiment.

Furthermore, FIG. 2 shows in detail a reference voltage correction circuit 20 in the ripple converter shown in FIG. 1.

As shown in FIG. 1, in the ripple converter of the present preferred embodiment, an N-type $FET_1$ (hereinafter simply referred to as an $FET_1$) and an inductor $L_1$ are connected in order from the side of an input terminal 3 between the input terminal 3 and an output terminal 4. The drain of the $FET_1$ is connected to the input terminal 3 and the source of the $FET_1$ is connected to the inductor $L_1$. Furthermore, the gate of the $FET_1$ is connected to the control signal output terminal of an H/S driver circuit 1. Moreover, a bootstrap circuit in which a bootstrap diode $D_0$ and a bootstrap capacitor $C_0$ are connected in series is connected between the drain and source of the $FET_1$. In the bootstrap circuit, the anode of the bootstrap diode $D_0$ is connected to the drain of the $FET_1$ and the input terminal 3, and the bootstrap capacitor $C_0$ is connected to the source of the $FET_1$.

In the H/S driver circuit 1, the power input side terminal is connected to the connection point between the cathode of the bootstrap diode $D_0$ and the bootstrap capacitor $C_0$ of the bootstrap circuit, and the ground side terminal is connected to the connection point between the bootstrap capacitor $C_0$ and the source of the $FET_1$. In this way, the charged voltage at the bootstrap capacitor $C_0$ of the bootstrap circuit is applied to the H/S driver circuit 1. Moreover, the output terminal of a comparator 10 is connected to the signal input terminal of the H/S driver circuit 1 through an inverter 12, and a signal output from the comparator 10 is inverted and input to the signal input terminal.

An N-type $FET_2$ (hereinafter simply referred to as a $FET_2$) is connected between the ground terminal 5 and the connection point of the $FET_1$ and the inductor $L_1$. Here, in the $FET_2$, the drain is connected to the connection point between the $FET_1$ and the inductor L1 and the source is connected to the ground terminal 5. Furthermore, the gate of the $FET_2$ is connected to the control signal output terminal of an L/S driver circuit 2.

The power input terminal of the L/S driver circuit 2 is connected to the input terminal 3 and the ground side terminal is connected to the ground terminal 5. Moreover, the output terminal of the comparator 10 is connected to the signal input terminal of the L/S driver circuit 2 and a signal input from the comparator 10 is directly input to the signal input terminal.

A capacitor $C_1$ is connected between the ground terminal and the connection point between the inductor $L_1$ and the output terminal 4, and a series circuit of resistors R1 and R2 is connected in parallel with the capacitor $C_1$.

The connection point of the resistors R1 and R2 is connected to the non-inverting terminal of the comparator 10 and the connection point is also connected to the input side of the reference voltage correction circuit 20.

In the comparator 10, the non-inverting input terminal is connected to the connection point between the resistor $R_1$ and the resistor $R_2$, and the inverting input terminal is connected to the output side of the reference voltage correction circuit 20. Furthermore, the positive power-supply terminal of the comparator 10 is connected to the input terminal 3 and the negative power-supply terminal is grounded. Then, in the comparator 10, a voltage to be input to the non-inverting input terminal, that is, a voltage Vor obtained by dividing an output voltage Vout by the resistance values of the resistors $R_1$ and $R_2$ is compared with a correction reference voltage output from the reference voltage correction circuit 20 which is to be input to the non-inverting input terminal and a switching control signal of a two-state signal with a High state or a Low state is output.

Here, a smoothing circuit 13 includes the inductor $L_1$ and the capacitor $C_1$, and a comparator circuit 14 includes the comparator 10, the resistors $R_1$ and $R_2$, and the reference voltage correction circuit 20.

The reference voltage correction circuit 20 includes an operational amplifier 100, the inverting input terminal of which is connected to the connection point between the resistors $R_1$ and $R_2$ through a resistor $R_{21}$ and a capacitor $C_{21}$ connected between the output terminal of the operational amplifier 100 and the inverting input terminal. The non-inverting input terminal of the operational amplifier 100 is connected to the connection point between resistors $R_{33}$ and $R_{34}$ constituting a series circuit, the resistor $R_{33}$ is grounded, and the resistor $R_{34}$ is connected to the positive electrode of a reference power supply outputting a reference voltage Vo. The negative electrode of the reference power supply is grounded. The output terminal of the operational amplifier 100 is connected to the connection point between resistors $R_{23}$ and $R_{24}$ constituting a series circuit through a resistor $R_{22}$, the resistor $R_{23}$ is grounded, and the resistor $R_{24}$ is connected to the positive voltage side of the reference power supply outputting the reference voltage Vo. Furthermore, the connection point between the resistors $R_{23}$ and $R_{24}$ is connected to the inverting terminal of the comparator 10. Moreover, the resistors $R_{23}$ and $R_{33}$ preferably have the same resistance value, and the resistors $R_{24}$ and $R_{34}$ preferably have the same resistance value. The series circuit of the resistors $R_{23}$ and $R_{24}$ and the series circuit of the resistors $R_{33}$ and $R_{34}$ correspond to a voltage divider circuit of a preferred embodiment of the present invention. Furthermore, the reference voltage Vo is a voltage determined by the voltage divider ratio due to the resistors $R_{33}$ and $R_{34}$ of the divider voltage due to the resistors $R_1$ and $R_2$ to a desired output voltage so that the output voltage Vout may become the desired voltage value (set voltage value).

When such a circuit is constructed, an integration circuit is defined by the operational amplifier 100, the capacitor $C_{21}$, and the resistor $R_{21}$, and a correction voltage in accordance with the difference between the time average of a divider voltage Vor due to the resistors $R_1$ and $R_2$ of the output voltage Vout and a divider reference voltage Vop obtained by dividing the reference voltage Vo by the resistance values of the resistors $R_{33}$ and $R_{34}$ is output from the output terminal of the operational amplifier 100. Then, the reference voltage correction circuit 20 outputs a correction reference voltage Vref, that is, the divider voltage (divider reference voltage Vop) due to the resistors $R_{23}$ and $R_{24}$ of the reference voltage Vo corrected by the correction voltage to the inverting input terminal of the comparator 10. Here, the divider reference voltage Vop is a comparative voltage.

The ripple converter constructed as described above operates in the following way.

In the initial state where the output voltage Vout is 0 V, a voltage of 0 V is input to the non-inverting input terminal of the comparator 10. On the other hand, the correction reference voltage Vref of a fixed voltage value in accordance with the reference voltage Vo is input to the inverting input terminal of the comparator 10. Therefore, the comparator 10 outputs a switching control signal of 0 V (Low signal) by comparing the voltages. The inverter 12 outputs a High signal of a fixed voltage to the H/S driver circuit 1 by inverting the Low signal.

When the High signal is input, the H/S driver circuit 1 generates a gate-on signal (hereinafter simply referred to as an on signal) and outputs the on signal to the gate of the $FET_1$. At this time, since the bootstrap capacitor $C_0$ is charged by the input voltage Vin in advance, an on signal having a voltage value higher than the input voltage Vin raised by the bootstrap capacitor $C_0$ is input to the gate of the $FET_1$. On the other hand, a Low signal is directly input to the L/S driver circuit 2 from the comparator 10, and the L/S driver circuit 2 generates a gate-off signal (hereinafter simply referred to as an off signal) due to the Low signal and outputs the off signal to the gate of the $FET_2$.

Thus, since the $FET_1$ is turned on by an on signal from the H/S driver circuit 1 and the $FET_2$ is turned off by an off signal from the L/S driver circuit 2, a voltage in accordance with an input voltage Vin is supplied to the output terminal 4 through the smoothing circuit 13 having the inductor $L_1$ and the output voltage Vout gradually increases.

When an output voltage Vout in accordance with an input voltage Vin is supplied to the output terminal 4, a divider voltage Vor (=Vout·$R_2$/($R_1$+$R_2$)) due to the resistors $R_1$ and $R_2$ connected between the output terminal 4 and the ground terminal 5 is input to the non-inverting input terminal of the comparator 10. When the divider voltage Vor is lower than the correction reference voltage Vref input to the inverting input terminal from the reference voltage correction circuit 20, the output of the comparator 10 does not change. At this time, the correction reference voltage Vref changes in accordance with the change of the input voltage Vout caused by the operation of the reference voltage correction circuit 20 as will be described later.

Next, when an output voltage Vout where the divider voltage Vor is larger than the correction reference voltage Vref is output from the output terminal 4, a switching control signal of a High signal in accordance with the power supply voltage corresponding to the input voltage Vin is output from the comparator 10. The inverter 12 inverts the input High signal and outputs a Low signal to the H/S driver circuit 1.

When the Low signal is input, the H/S driver circuit 1 generates an off signal to the gate of the $FET_1$. On the other hand, a High signal is input to the L/S driver circuit 2 directly from the comparator 10, and, when the High signal is input, the L/S driver circuit 2 generates an on signal and outputs the on signal to the gate of the $FET_2$.

In this way, the $FET_1$ is turned off by an off signal being input and the $FET_2$ is turned on by an on signal being input. Thus, the connection point of the drain of the $FET_1$, the source of the $FET_2$, and the inductor $L_1$ is made conductive to the ground terminal 5 between the drain and source of the $FET_2$ which is in the on state. Thus, the voltage Vds (substantially 0 V) between the drain and source of the $FET_2$ which is in the on state is applied to the inductor $L_1$, and thus, the input voltage Vout gradually decreases. At this time, a voltage obtained by subtracting the backward voltage of the bootstrap diode $D_0$ and the voltage between the drain and the source of the $FET_2$ from the input voltage Vin is applied to the bootstrap capacitor $C_0$ connected to the H/S driver circuit 1 in parallel to charge the bootstrap capacitor $C_0$.

This operation continues until the divider voltage Vor becomes lower than the correction reference voltage Vref, and, when the divider voltage Vor becomes lower than the correction reference voltage Vref, the $FET_1$ is turned on and the $FET_2$ is turned off as described above. Also at this time, the correction reference voltage Vref changes in accordance with the change of the output voltage Vout due to the operation of the reference voltage correction circuit 20 to be described later.

Then, an output voltage Vout substantially in agreement with a desired voltage value (corresponding to a set voltage of a preferred embodiment of the present invention) on the basis of the reference voltage Vo is continuously output from the output terminal 4 by repeating the above-described operation.

Next, the specific operation of the reference voltage correction circuit 20 is described.

A divider reference voltage Vop (Vo·$R_{33}$/($R_{33}$+$R_{34}$)) obtained by dividing the reference voltage Vo generated in the reference power supply by the resistance values of the resistors $R_{33}$ and $R_{34}$ is input to the non-inverting input terminal of the operational amplifier 100 in the reference voltage correction circuit 20.

When the divider voltage Vor of the output voltage Vout is input to the inverting input terminal of the operational amplifier 100 through the resistor $R_{21}$, the operational amplifier 100 generates a correction voltage by comparing the divider voltage Vor input with the divider reference voltage Vop input to the non-inverting input terminal. For example, when the voltage input to the inverting input terminal is lower than the divider reference voltage Vop, the correction voltage is a fixed positive voltage value, and, when the voltage input to the inverting input terminal is higher than the divider reference voltage Vor, the correction voltage is a fixed negative voltage value.

Furthermore, a voltage of the same level as the divider reference voltage Vop is supplied to the connection point between the resistors $R_{23}$ and $R_{24}$ from the reference power supply in such a way that the reference voltage Vo is divided by the resistance values of the resistors $R_{24}$ and $R_{23}$. Here, the correction voltage output from the operational amplifier 100 is applied to the connection point between the resistors $R_{23}$ and $R_{24}$ through the resistor $R_{22}$, and a voltage being the divider reference voltage Vop corrected by the correction voltage is output as a correction reference voltage Vref to the inverting input terminal of the comparator 10.

Since the operational amplifier 100 includes an integration circuit together with the capacitor $C_{21}$ and the resistor $R_{21}$ as described above, when the divider voltage Vor of the output voltage Vout is continuously input, the average value of the divider voltage Vor is input to the inverting input terminal. That is, the time average of the divider voltage Vor is input with the passage of time. Therefore, a correction voltage in accordance with the difference between the time average of the divider voltage Vor of the output voltage Vout and the divider reference voltage Vop is output from the operational amplifier 100. Then, the correction reference voltage Vref being the divider reference voltage Vop corrected by a divider voltage due to the resistors $R_{22}$ and $R_{23}$ of the correction voltage, as the output of the reference voltage correction circuit 20, is input to the inverting input terminal of the comparator 10.

Here, when the input voltage Vin is high and the average value of the output voltage Vout is higher than a set voltage Vset (voltage as a reference voltage), the divider voltage Vor of the output voltage Vout also becomes higher than the correction reference voltage Vop. This is because, as described with respect to the problems of the prior art, the period where the instantaneous value of the output voltage is higher than the set voltage Vset continues for a long time. In such a case, in the reference voltage correction circuit 20 shown in the present preferred embodiment, since the average value of the divider voltage Vor is higher than the divider reference voltage Vop, a negative correction voltage is output from the operational amplifier 100, and a correction reference voltage Vref which is a divider reference voltage Vop corrected by the negative correction voltage, that is, the correction reference voltage Vref lower than the divider reference voltage Vop is output to the inverting input terminal of the comparator 10. The comparator 10 outputs a switching control signal by comparing the correction reference voltage Vref with the divider voltage Vor of the output voltage Vout. The H/S driver circuit 1 and L/S driver circuit 2 on and off control the $FET_1$ and $FET_2$ on the basis of the switching control signal, respectively. Then, the peak voltages on the maximum-value side and minimum-value side of the instantaneous value of the output voltage Vout decreases in such a way that the $FET_1$ and $FET_2$ are on and off controlled by the correction reference voltage Vref.

The operation in this case is specifically described with reference to FIG. 3.

Figure 3A:
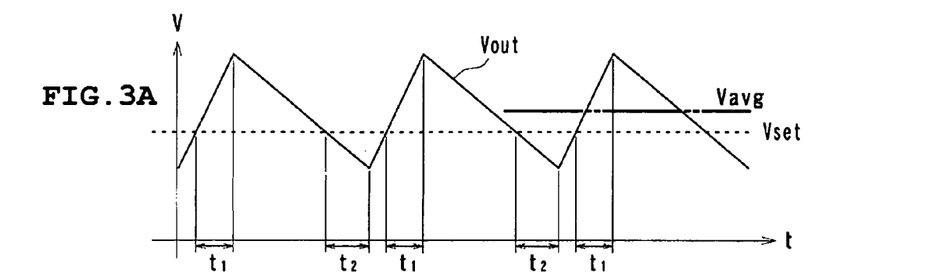
FIGS. 3(A) and 3(B) show a set voltage Vset, the waveform of the instantaneous value and the average voltage of an output voltage Vout when a switching control is performed at the set voltage Vset, a correction set voltage Vsa, and the waveform of the instantaneous value and the average voltage of an output voltage Vout when a switching control is performed at the correction set voltage Vsa in the case where the input voltage is high.

FIG. 3(A) shows a set voltage Vset (dependent on the reference voltage Vo) and the waveform of the instantaneous value and the average voltage Vavg of the output voltage Vout when a switching control is performed at the set voltage Vset in the case where the input voltage Vin is high. FIG. 3(B) shows a correction set voltage Vsa (dependent on the correction reference voltage Vref) and the waveform of the instantaneous value and the average voltage Vavg of the output voltage Vout when a switching control is performed by the correction set voltage Vsa in the case where the input voltage Vin is high.

First, since the time t1 from the point where the instantaneous value of the output voltage Vout becomes equal to or higher than the set voltage Vset and the correction set voltage Vsa to the point where the $FET_1$ is turned off (the point where the instantaneous value becomes the maximum voltage) is dependent on the transmission characteristics of a control signal of the converter and the switching characteristics of the $FET_1$, the time t1 is not dependent on whether or not the set voltage Vset is corrected. Accordingly, the time t1 is the same whether or not the set voltage Vset is corrected. In the same way, since the time t2 from the point where the instantaneous value of the output voltage Vout becomes equal to or lower than the set voltage Vset and the correction set voltage Vsa to the point of time where the $FET_1$ is turned on (point where the instantaneous value becomes the minimum voltage) is dependent on the transmission characteristics of a control signal of the converter and the switching characteristics of the $FET_1$, the time t2 is not dependent on whether or not the set voltage Vset is corrected. Accordingly, the time t2 is the same whether or not the set voltage Vset is corrected. Moreover, since the input voltage Vin is the same whether or not the set voltage Vset is corrected, the rate of time-dependent change of the output voltage Vout due to the switching of the $FET_1$ (inclination of the voltage waveform) is also the same.

Figure 3B:
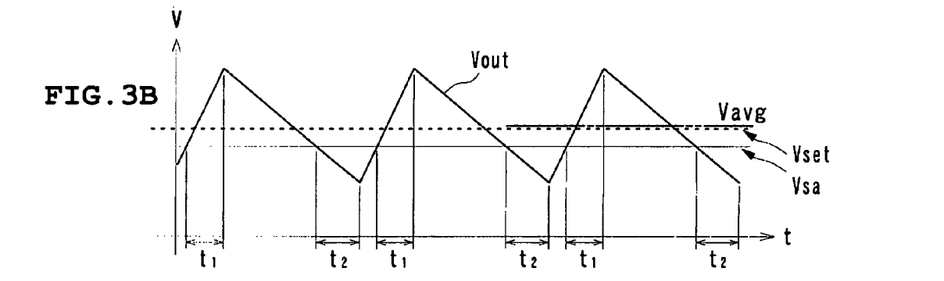

Therefore, as shown in FIG. 3(B), when the correction set voltage Vsa is lower than the set voltage Vset, since the time t1 is the same and the ratio of time-dependent change (rate of increase) is the same as described above, the maximum value of the output voltage Vout is lowered as much as the amount where the correction set voltage Vsa is lower than the set voltage Vset. At the same time, since the time t2 is the same and the ratio of time-dependent change (rate of decrease) is the same as described above, the minimum value of the output voltage Vout is also lowered as much as the amount where the correction set voltage is lower than the set voltage Vset. Because of this, the output voltage Vout is lowered as a whole and, in accordance with this, the average voltage Vavg is lowered. At this time, since the reference voltage correction circuit 20 outputs a correction voltage in accordance with the difference between the average voltage of the divider voltage Vor of the output voltage Vout and the divider reference voltage Vop, when the average voltage Vavg of the divider voltage Vor becomes close to the divider reference voltage Vop, the absolute value of the correction voltage is also lowered. Thus, the average voltage Vavg of the output voltage Vout gradually becomes close to the set voltage Vset.

Figure 4A:
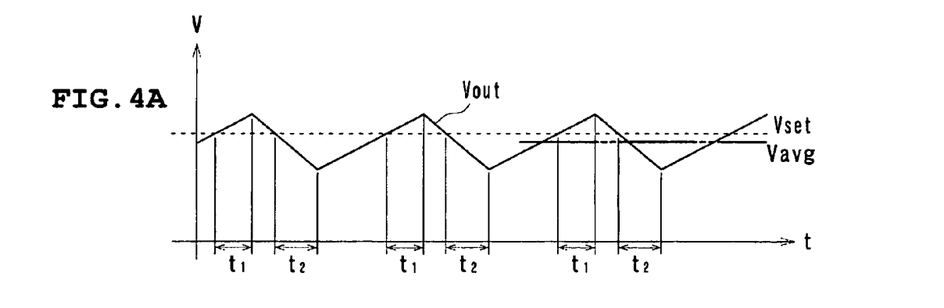
FIGS. 4(A) and 4(B) show a set voltage Vset, the waveform of the instantaneous value and the average voltage of an output voltage Vout before a switching control is performed at the correction set voltage Vsa, a correction set voltage Vsa, and the waveform of the instantaneous value and the average voltage of an output voltage Vout when a switching control is performed at the correction set voltage Vsa in the case where the input voltage is low.
Figure 4B:
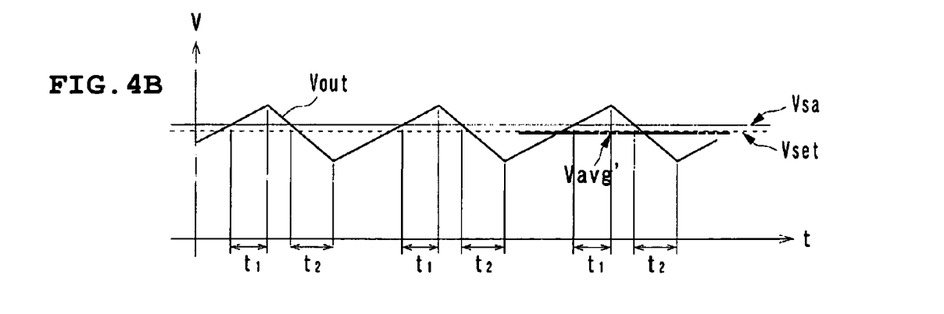

Next, when the input voltage Vin is low and the average value of the output voltage Vout is lower than the set voltage Vset (voltage as a reference voltage), the divider voltage Vor of the output voltage Vout also becomes lower than the divider reference voltage Vop. This is because the period where the instantaneous value of the set voltage Vset is lower than the set voltage Vset becomes longer as described with respect to the problems with the prior art. In such a case, in the reference voltage correction circuit 20 shown in the present preferred embodiment, since the average value of the divider voltage Vop is lower than the divider reference voltage Vop, a positive correction voltage is output from the operational amplifier 100, and the correction reference voltage Vref being the divider reference voltage Vop corrected by the positive correction voltage, that is, the correction reference voltage higher than the divider reference voltage Vop is output to the inverting input terminal of the comparator 10. The comparator 10 outputs a switching control signal by comparing the correction reference voltage Vref with the divider voltage Vor of the output voltage Vout. The H/S driver circuit 1 and L/S driver circuit 2 on and off control the $FET_1$ and $FET_2$ on the basis of the switching control signal. Then, the peak on the maximum-value side and the peak on the minimum-value side of the instantaneous value of the output voltage Vout increase and the average value of the output voltage Vout increases in such a way that the $FET_1$ and $FET_2$ are on and off controlled by the correction reference voltage Vref.

The operation in this case is specifically described with reference to FIG. 4.

FIG. 4(A) shows a set voltage Vset (dependent on the reference voltage Vo) and the waveform of the instantaneous value and the average voltage Vavg of the output voltage Vout when a switching control is performed at the set voltage Vset in the case where the input voltage Vin is low. FIG. 4(B) shows a correction set voltage Vsa (dependent on the correction reference voltage Vref) and the waveform of the instantaneous value and the average voltage Vavg of the output voltage Vout when a switching control is performed by the correction set voltage Vsa in the case where the input voltage Vin is low.

First, in the same way as in the case where the correction set voltage Vsa is lower than the set voltage Vset, the time t1 from the point where the instantaneous value of the output voltage Vout becomes equal to or higher than the set voltage Vset and the correction set voltage Vsa to the point where the $FET_1$ is turned off (point where the instantaneous value becomes the maximum voltage), the time t2 from the point where the instantaneous value of the output voltage Vout becomes equal to or lower than the set voltage Vset and the correction set voltage Vsa to the point where the $FET_1$ is turned on (point where the instantaneous value becomes the minimum voltage), and the rate of time-dependent change of the output voltage Vout due to the switching of the $FET_1$ (inclination of the voltage waveform) are always the same.

Therefore, as shown in FIG. 4(B), when the correction set voltage Vsa is higher than the set voltage Vset, since the time t1 is the same and the ratio of time-dependent change (the rate of increase) is the same as described above, the maximum value of the output voltage Vout is increased as much as the amount where the correction set voltage Vsa is higher than the set voltage Vset. At the same time, since the time t2 is the same and the ratio of time-dependent change (rate of decrease) is the same as described above, the minimum value of the output voltage Vout is also increased as much as the amount where the correction set voltage Vsa is higher than the set voltage Vset. Because of this, the output voltage Vout is increased as a whole and, in accordance with this, the average voltage Vavg is increased. At this time, since the reference voltage correction circuit 20 outputs a correction voltage in accordance with the difference between the average voltage of the divider voltage Vor of the output voltage Vout and the divider reference voltage Vop, when the average voltage Vavg of the divider voltage Vor becomes close to the divider reference voltage Vop, the absolute value of the correction voltage is also lowered. Thus, the average voltage Vavg of the output voltage Vout gradually becomes close to the set voltage Vset.

In the description up to now, although the change of the input voltage Vin is assumed, even if the input voltage Vin is constant and the set value of the output voltage changes, the fact that the duty factor changes with that and the output voltage Vout deviates from a set value is the same, and this case also functions in the same way as the above.

Figure 5:
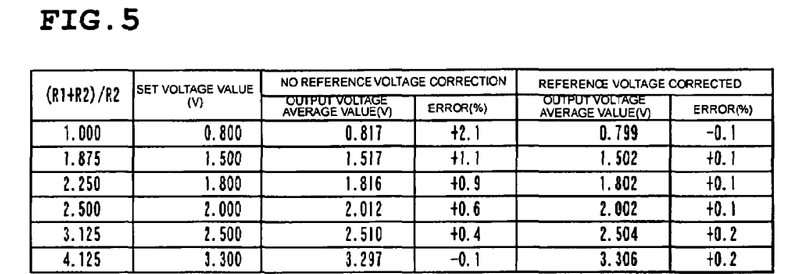
FIG. 5 shows the error of the average voltage value of the output voltage Vout and the set voltage value in the case where the input voltage Vin is 5.0 V, the reference voltage Vo is 0.8 V, and the set voltage value is changed.

FIG. 5 shows the average voltage value of the output voltage Vout, the set voltage value, and their errors in the case where the input voltage Vin is about 5.0 V, the reference voltage Vo is about 0.8 V, and the set voltage value is changed. The figure shows the case where the ripple converter includes the reference voltage correction circuit and the case where the ripple converter does not include the reference voltage correction circuit.

FIG. 5 shows the effect in the case where the reference voltage Vo is constant, the set voltage Vset is decided by changing the divider ratio due to the resistors $R_1$ and $R_2$ between the output terminal 4 and the ground terminal 5 in FIG. 1, and the output voltage set value to the input voltage Vin is changed.

As shown in FIG. 5, when the reference voltage correction circuit is not provided, the set voltage Vset to the input voltage Vin is reduced, the output voltage Vout becomes higher than the set voltage Vset as the difference between the set voltage Vset and the input voltage Vin increases, the set voltage Vset becomes close to the input voltage Vin, and the output voltage becomes lower than the set voltage Vset as the difference between the set voltage Vset and the input voltage Vin.

On the other hand, when the reference voltage correction circuit is provided as shown in the present preferred embodiment, the output voltage Vout can be made substantially in accord with the set voltage Vset without being affected by the relatively large or small relationship between the set voltage Vset and the input voltage Vin.

When constructed as described above, a ripple converter type DC—DC converter of a simple structure in which a desired output voltage can be obtained without being affected by the value of switching duty factor can be constructed.

Next, a converter device according to a second preferred embodiment is described with reference to FIG. 6.

Figure 6:
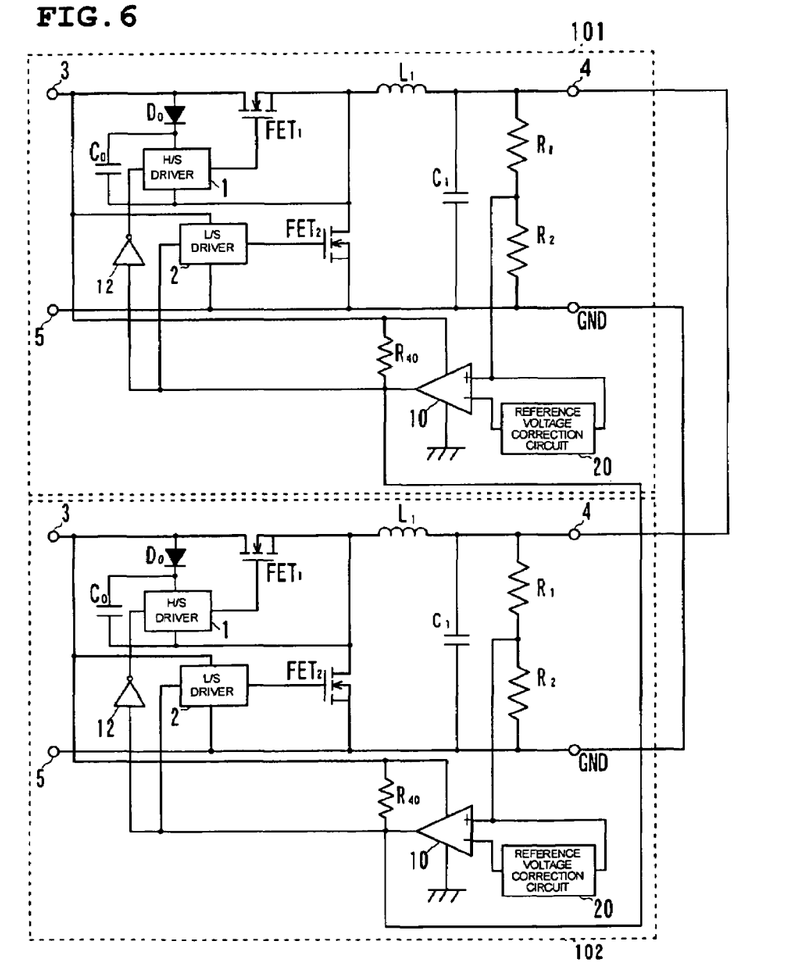
FIG. 6 is a circuit diagram showing the construction of a converter device according to a second preferred embodiment of the present invention.

FIG. 6 shows a circuit diagram showing the structure of a converter device according to the present preferred embodiment.

As shown in FIG. 6, in the converter device of the present preferred embodiment, the output terminals 4 and the ground terminals 5 of ripple converters 101 and 102 are connected to each other and an output voltage is output from the common line. The structure of the ripple converters 101 and 102 of the converter device is preferably substantially the same as the ripple converter shown in FIG. 1.

Furthermore, the output of the comparator of each of the ripple converters 101 and 102 is preferably an open drain type or an open collector type and is pulled up by a resistor R40. Then, the output terminals of the comparators 10 of the ripple converters 101 and 102 are connected to each other to constitute a wired type OR circuit.

In such a circuit construction, when the output signal (switching control signal) of each comparator 10 of the ripple converters 101 and 102 follows OR logic (negative logic), that is, when the switching control signal output from at least one comparator 10 is a Low signal, the ripple converters 101 and 102 are controlled in accordance with the signal. Thus, the ripple converters 101 and 102 connected in parallel are synchronously controlled and the output currents of the ripple converters 101 and 102 become substantially the same. Moreover, in the state of ordinary operation, either of the ripple converters, in which the output voltage is high, is switched to the Low state and the output of the comparator of the other ripple converter is fixed to the High state. Furthermore, when the output voltages are in accord with each other, the ripple converters are synchronized to either of them which have a low frequency.

Furthermore, since the reference voltage correction circuit 20 is provided in each of the ripple converters 101 and 102, the output voltage of the ripple converters 101 and 102 is substantially in accord with the set voltage Vset regardless of the amplitude of the input voltage. Then, since the correction reference voltage in each of the ripple converters 101 and 102 is stable, even if the characteristics of the converters are changed by the effect of the external environment, etc., the high and low relationship between the correction reference voltages does not change and is able to continue a stable parallel operation.

Figure 7:
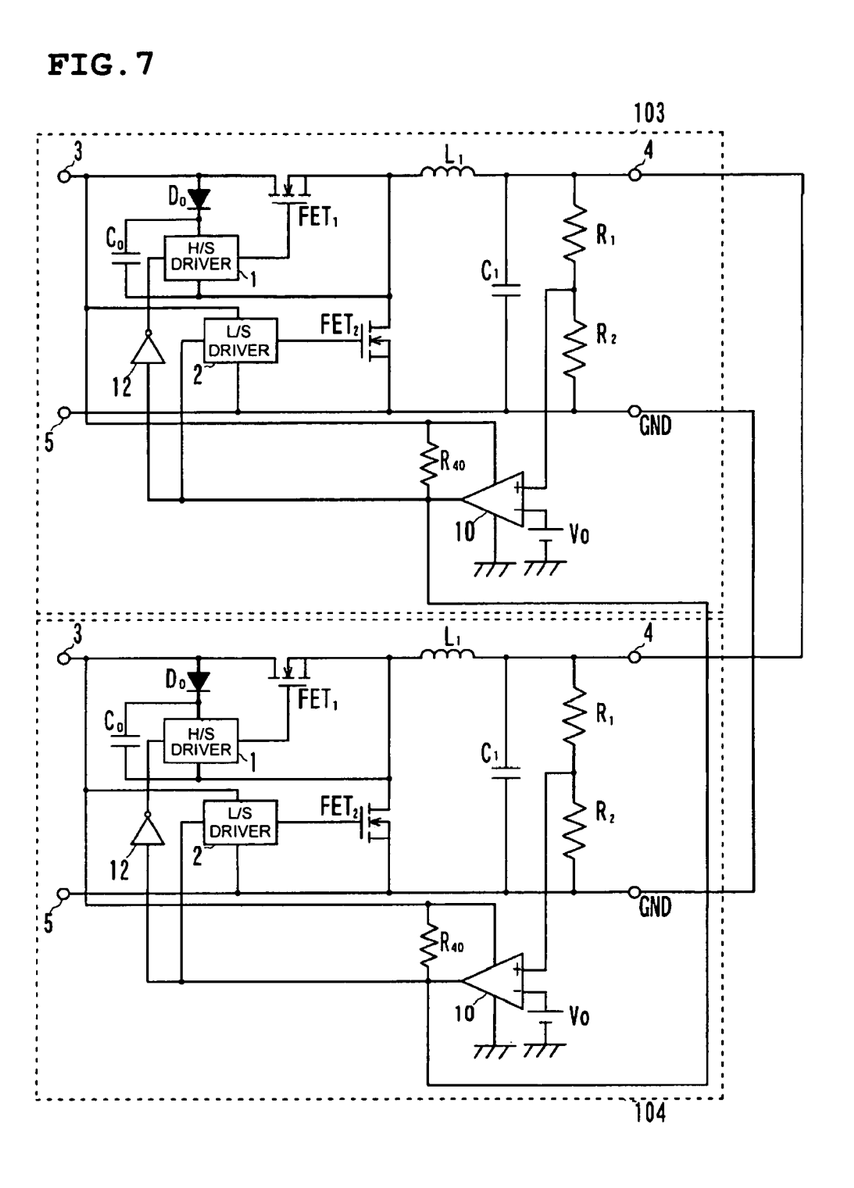
FIG. 7 is a circuit diagram of a converter device composed of ripple converters having no reference voltage correction circuit therein.
Figure 8A:
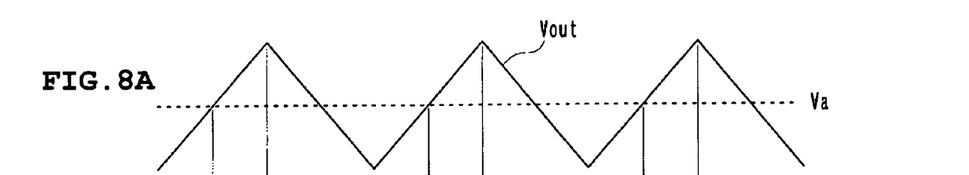
FIGS. 8(A)–8(D) show the output voltage waveform and the change of the state of the FET of the ripple converters used in the converter device shown in FIG. 7.
Figure 8B:
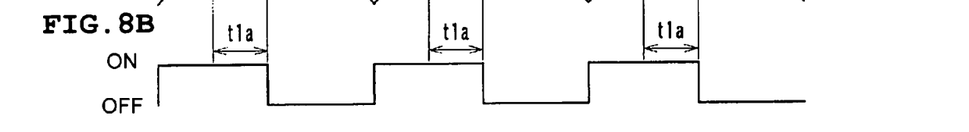
Figure 8C:
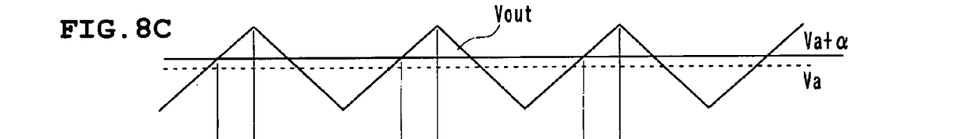
Figure 8D:
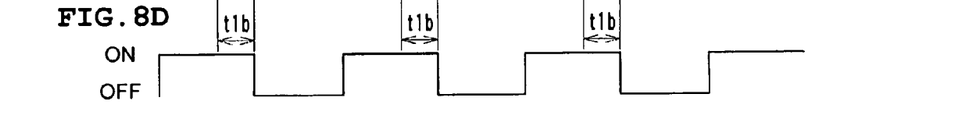

This point is specifically described. FIG. 7 is the circuit diagram of a converter device in which a wired type OR circuit as shown in FIG. 6 is constituted by using ripple converters 103 and 104 not having a reference voltage correction circuit 20.

Furthermore, FIG. 8 shows output voltage waveforms of the ripple converters 103 and 104 used in the converter device shown in FIG. 7 and the change of the state of the FET. FIG. 8(A) shows the output voltage waveform of the ripple converter 103, FIG. 8(B) shows the change of the state of the $FET_1$ in the ripple converter 103, FIG. 8(C) shows the output voltage waveform of the ripple converter 104, and FIG. 8(D) shows the change of the state of the $FET_1$ in the ripple converter 104.

As shown in FIG. 7, in the converter device using the ripple converters 103 and 104 in which the reference voltage correction circuit 20 is not used, a reference power supply generating the reference voltage Vo is directly connected to the inverting input terminal of the comparator 10, and the other construction is the same as in the converter device shown in FIG. 6.

In such a circuit construction, although the ripple converters 103 and 104 are designed in the same way, as shown in FIG. 8, when the output voltage and the switching delay time are different due to variations of the characteristics of the structure elements and the circuit, the operation of the converter device becomes unstable.

As shown in FIG. 8, it is assumed that the reference voltage of the ripple converter 103 is practically Va, the delay time is t1a, and the average voltage of the ripple voltage is Va. Then, the case, in which the reference voltage of the ripple converter 104 is practically Va+α(α>0) due to characteristic variations, etc., the delay time is t1b (<t1a), and the average of the feedback voltage in the ripple converter 104 is Va due to the cancellation between variations of the reference voltage and variations of the delay time t1b, is considered.

Here, when the ripple converters 103 and 104 are operated in parallel, because of the above-described characteristics, first, the converter device operates in synchronization with the output of the comparator 10 of the ripple converter 103 having a low operation frequency. However, when the delay time t1b of the ripple converter 104 increases due to external factors, etc., during the parallel operation, the output of the ripple converter 104 increases and the converter device operates in synchronization with the output of the comparator 10 of the ripple converter 104. That is, the comparator 10 as a master controlling the operation of the converter device is easily switched between the ripple converters 103 and 104 due to external factors, etc. That is, the operation of the converter device becomes unstable.

Here, by using the structure of the present preferred embodiment (structure shown in FIG. 6), that is, by providing the reference voltage correction circuit 20 in each of the ripple converters in parallel operation, even if the operation shown in FIG. 8 is performed by the ripple converters 101 and 102 in simple parallel operation in FIG. 6, for example, the voltage (practical reference voltage) input to the comparator is stabilized at the correction reference voltage output from the reference voltage correction circuit 20. Also, the ripple converter 101 is synchronized to the output of the comparator 10 of the ripple converter 102 having a high output voltage. That is, even if the delay time is changed due to external factors, etc., the practical reference voltage is corrected by the reference voltage correction circuit 20 and stabilized at the correction reference voltage, and, as a result, the comparator 10 as a master is always on the side of the ripple converter 102.

At this time, in the reference voltage correction circuit 20 in the ripple converter 101, since the divider voltage Vor is always higher than the divider reference voltage Vop, the output of the operational amplifier 100 in the reference voltage correction circuit 20 becomes in the Low state and the correction reference voltage Vref of the comparator 10 becomes far lower than the divider reference voltage Vop and the divider voltage Vor. Therefore, a switching control signal output from the comparator 10 is in the High state. In this way, the practical reference voltage of the ripple converter 101 is greatly reduced from the original value, and, since the voltage does not cross the triangular waveform appearing as a divider voltage Vor, even if the delay times t1a and t1b change due to external factors, etc., the switching control signal output from the comparator 10 of the ripple converter 101 is always in the High state. Thus, the ripple converter 102 always functions as the master converter and the master and slave relationship does not change between the ripple converters. As a result, when the structure of the present preferred embodiment is used, a converter device capable of stable operation can be more securely constructed.

Next, the experimental result using a converter device having the structure shown in FIG. 6 of the present preferred embodiment is shown.

Figure 9A:
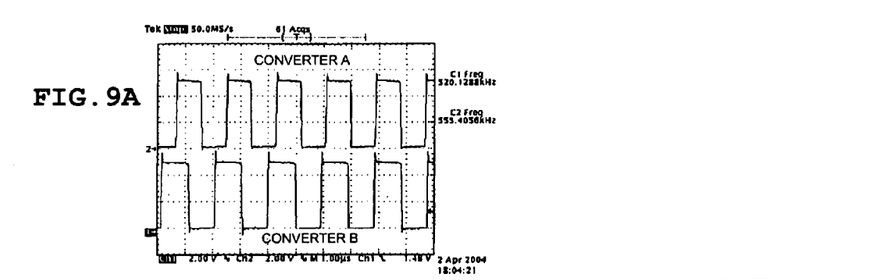
FIGS. 9(A)–9(D) show the waveform, operation frequency, output voltage, and output current share ratio of a switching control signal when each of two ripple converters having different output voltages and operation frequencies is solely operated, and the waveform, operation frequency, output voltage, and output current share ratio of a switching control signal when the two ripple converters connected in parallel are operated.
Figure 9B:
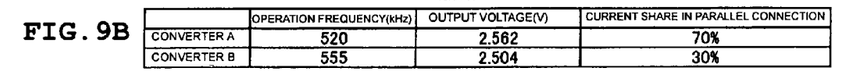

FIG. 9(A) and FIG. 9(B) show the waveform, operation frequency, output voltage, and output current share ratio of a switching control signal when each of two ripple converters constructed so as to obtain a fixed output voltage, respectively, is solely operated. Furthermore, FIG. 9(C) and FIG. 9(D) show the waveform, operation frequency, output voltage, and output current share ratio of a switching control signal when the two ripple converters in parallel connection are operated.

Moreover, in the present preferred embodiment, a ripple converter A having an operation frequency of 520 kHz and an output voltage of 2.562 V when solely operated and a ripple converter B having an operation frequency of 555 kHz and an output voltage of 2.504 V were used as an example.

As shown in FIG. 9(A) and FIG. 9(B), when each of the ripple converters A and B is independently operated, naturally the ripple converters A and B operate to have the characteristics (operation frequency and output voltage) in accordance with the characteristics when solely operated, respectively. Accordingly, when they are simply operated in parallel, a beat produced by the difference between the operation frequencies is generated, the share ratios of the ripple converter A and ripple converter B becomes about 70% and 30%, and, since the current sharing performance is reduced, the operation at the time of transition load becomes difficult to stabilize.

Figure 9C:
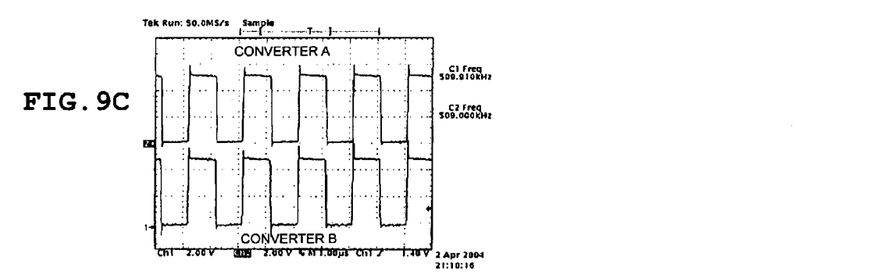
Figure 9D:
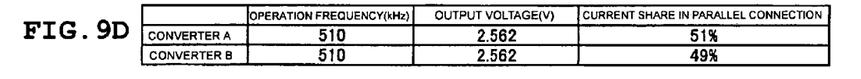

On the other hand, as shown in FIG. 9(C) and FIG. 9(D), when these ripple converters A and B are operated in parallel according to the structure of the present preferred embodiment, the driving frequencies of both ripple converters A and B are in accord with each other at 510 kHz and the output voltages are also in accord with each other at 2.562 V. Thus, since the output characteristics of both ripple converters A and B are in accord and the output current share ratio becomes 51% and 49%, that is, substantially the same, the load current is stabilized and the performance of current sharing is improved. As a result, a stable operating converter device can be constructed.

Moreover, in the ripple converters of the converter device shown in the above-described second preferred embodiment, although a wired OR circuit is constructed by making the output of the comparator of an open drain type or open collector type, the above construction can be applied without using such a comparator.

Figure 10:
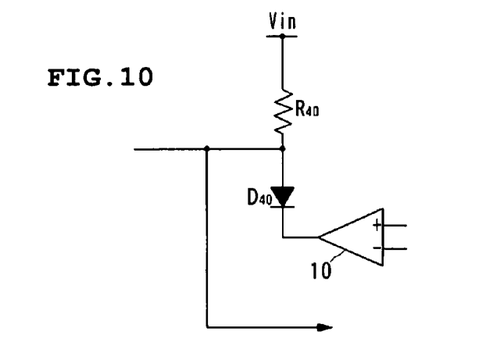
FIG. 10 is a circuit diagram showing the output portion of the comparator of the ripple converter of the converter device shown in FIG. 6.

FIG. 10 shows a circuit diagram showing the output portion of the comparator 10 of the ripple converters 101 and 102 of the converter device shown in FIG. 6.

As shown in FIG. 10, when a comparator which is not an open drain type or an open collector type is used, the output of the comparator 10 is pulled up by a resistor $R_{40}$ through a diode $D_{40}$ and the connection point between the diode $D_{40}$ and the resistor $R_{40}$ may be used in the parallel connection. By using such a construction, the same operation can be performed as in the case where a comparator of open drain type or open collection type is used in the circuit construction shown in FIG. 6.

Furthermore, FIG. 11 is a circuit diagram of another construction showing the output portion of the comparator 10 of the ripple converters 101 and 102 of the converter device shown in FIG. 6.

As shown in FIG. 11, when a comparator that is not an open drain type or an open collector type is used, the output of the comparator 10 is pulled down by the resistor $R_{40}$ through the diode $D_{40}$ and the connection point between the diode $D_{40}$ and the resistor $R_{40}$ may be used in the parallel connection. By using such a construction, two ripple converters may be made to operate in synchronization with a ripple converter having a lower output voltage, different from the case where a comparator of an open drain type or open collector type is used in the circuit construction shown in FIG. 6.

Furthermore, two ripple converters may be operated in synchronization with a ripple converter having a lower output voltage in such a way that an extraction circuit for an OR logic in the output of each comparator is used in the parallel connection in the output of the comparator.

Moreover, in the above-described preferred embodiment, although a converter device in which two ripple converters are connected in parallel is shown, the above-described construction can be applied to a converter device in which three or more ripple converters are connected in parallel. All the ripple converters may be synchronously controlled by the output of the comparator of any one of the ripple converters and the above-described effect can be obtained.

Furthermore, in the construction of the above-described preferred embodiment, although an example in which ripple converters are connected by using a wired OR circuit is shown, ripple converters are connected in parallel by other constructions such as OR circuits other than the wired type and the output may be shared by all.

While the present invention has been described with respect to preferred embodiments thereof, it will be apparent to those skilled in the art that the disclosed invention may be modified in numerous ways and may assume many preferred embodiments other those specifically set out and described above. Accordingly, it is intended by the appended claims to cover all modifications of the present invention which fall within the true spirit and scope of the invention.

What is claimed is:

1. A DC—DC converter comprising:
   an N-type FET arranged to on and off control an input voltage;
   a smoothing circuit arranged to smooth a voltage output from the N-type FET and output the smoothed voltage; and
   a comparator circuit arranged to output a switching control signal for the on and off control of the input voltage based on a comparison of the voltage output from the smoothing circuit with a set voltage; wherein the comparator circuit detects a time average value of the voltage output from the smoothing circuit, compares the detected time average value with the set voltage, and compares a correction set voltage obtained on the basis of the comparative result with the voltage output from the smoothing circuit.

2. The DC—DC converter as claimed in claim 1, wherein the comparator circuit includes a reference power supply arranged to generate a reference voltage in accordance with the set voltage, a divider circuit arranged to generate a comparative voltage by dividing the reference voltage, and a correction voltage generation circuit arranged to generate a correction voltage from the comparative voltage and the time average value of the voltage output from the smoothing circuit, wherein the correction set voltage is generated by applying the output from the correction voltage generation circuit to a generation point of the comparative voltage through a resistor.

3. A converter device comprising a plurality of DC—DC converters as claimed in claim 1, wherein output terminals of the plurality of DC—DC converters are connected in parallel, and a switching control signal common to all the DC—DC converters connected in parallel is generated by using the logical sum or logical product of the outputs of the comparator circuits of the plurality of DC—DC converters.

4. The converter device as claimed in claim 3, wherein each of the outputs of the comparator circuits is one of an open collector type or an open drain type and the outputs are connected to each other.

5. A converter device comprising a plurality of DC—DC converters as claimed in claim 2, wherein output terminals of the plurality of DC—DC converters are connected in parallel, and wherein a switching control signal common to all the DC—DC converters connected in parallel is generated by using the logical sum or logical product of the outputs of the comparator circuits of the plurality of DC—DC converters.

6. The converter device as claimed in claim 5, wherein each of the outputs of the comparator circuits is one of an open collector type or an open drain type and the outputs are connected to each other.

* * * * *